United States Patent [19]
Shirk et al.

[11] Patent Number: 6,007,096
[45] Date of Patent: Dec. 28, 1999

[54] INFLATOR HAVING A PRESSURE MONITORING INITIATOR

[75] Inventors: Bryan W. Shirk; Timothy A. Swann, both of Mesa, Ariz.

[73] Assignee: TRW Inc., Lyndhurst, Ohio

[21] Appl. No.: 09/062,949

[22] Filed: Apr. 20, 1998

[51] Int. Cl.[6] ............................ B60R 21/26; B60R 21/28
[52] U.S. Cl. ........................................... 280/736; 280/741
[58] Field of Search ..................................... 280/736, 741, 280/735; 102/530, 531; 200/83 R

[56] References Cited

U.S. PATENT DOCUMENTS

| | | |
|---|---|---|
| 3,771,121 | 11/1973 | Lohr . |
| 3,786,843 | 1/1974 | Stephenson et al. ...................... 141/13 |
| 3,869,143 | 3/1975 | Merrel . |
| 3,944,769 | 3/1976 | Wagner . |
| 5,099,762 | 3/1992 | Drapala ................................. 102/202.1 |
| 5,296,659 | 3/1994 | Potts et al. . |
| 5,487,559 | 1/1996 | Headley . |
| 5,918,900 | 7/1999 | Ennis ...................................... 280/736 |

FOREIGN PATENT DOCUMENTS 63-159156  7/1988  Japan .

Primary Examiner—Lanna Mai
Assistant Examiner—Faye M. Fleming
Attorney, Agent, or Firm—Tarolli, Sundheim, Covell, Tummino & Szabo LLP

[57] ABSTRACT

An apparatus (10) for inflating an inflatable vehicle occupant protection device, such as an air bag, includes a housing (20) defining a chamber (22), inflation fluid at a predetermined pressure in the chamber (22), and an initiator (34) for initiating the release of the inflation fluid from the chamber (22). The initiator (34) includes a capacitor (120, 240, 270), the capacitance of which changes with a change in pressure in the chamber (22). The apparatus (10) includes means, such as an electrical circuit (280), for sensing a change in the capacitance of the capacitor (286).

19 Claims, 3 Drawing Sheets

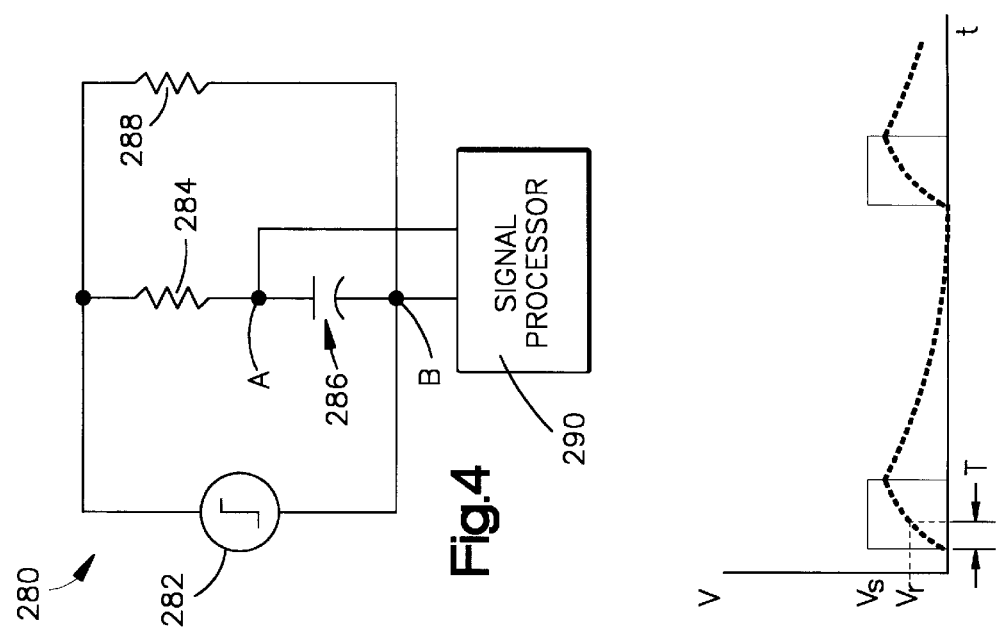
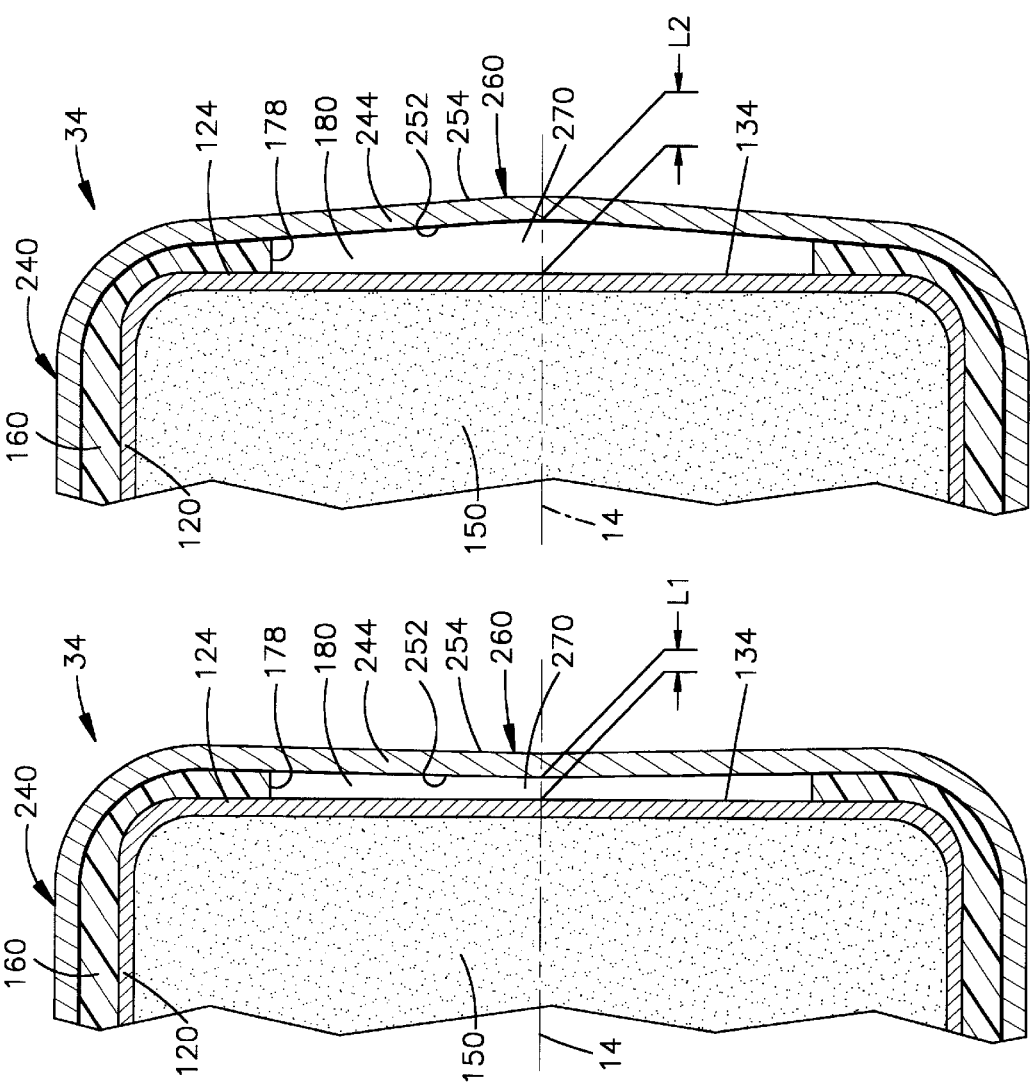

INFLATOR HAVING A PRESSURE MONITORING INITIATOR

TECHNICAL FIELD

The present invention relates to an inflator for inflating an inflatable vehicle occupant protection device, and particularly relates to an inflator having a pressure monitoring initiator.

BACKGROUND OF THE INVENTION

It is known to protect a vehicle occupant with an inflatable protection device, such as an air bag, that is inflated in the event of sudden vehicle deceleration such as occurs in a vehicle collision. The air bag helps to protect the vehicle occupant by restraining the movement of the occupant during the collision. The air bag is inflated by inflation fluid provided by an air bag inflator. The inflation fluid may include gas stored under pressure inside a closed container in the inflator. Typically, an electrically actuatable, pyrotechnic initiator is triggered by a collision sensor in the vehicle to cause the container to open and release the stored gas to inflate the air bag.

If the pressure of the stored gas in the container in the inflator drops below a predetermined pressure level, the air bag may not inflate properly. For this reason, it has been proposed to monitor the pressure level of stored gas in an air bag inflator using some type of pressure sensor.

SUMMARY OF THE INVENTION

The present invention is an apparatus for inflating an inflatable vehicle occupant protection device. The apparatus comprises means for defining a chamber, inflation fluid at a predetermined pressure in the chamber, and an initiator for initiating the release of the inflation fluid from the chamber. The initiator includes a capacitor, the capacitance of which changes with a change in pressure in the chamber. The apparatus further comprises means for sensing a change in the capacitance of the capacitor.

In a preferred embodiment, the initiator includes an electrically conductive outer housing member, an electrically conductive inner housing member, and means for providing a gap and extending between the inner and outer housing members. The capacitor comprises the inner and outer housing members and the gap. The means for sensing a change in pressure in the chamber comprises an electrical circuit which includes the capacitor.

The means for providing the gap comprises an electrically insulative material which is disposed between the inner and outer housing members and which partially defines the gap. The outer housing member has a deflectable portion that deflects in response to pressure changes in the chamber. The gap has a predetermined dimension measured along the axis and extending between the inner housing member and the deflectable portion of the outer housing member when the inflation fluid is at the predetermined pressure level. The predetermined axial dimension of the gap changes in response to a change in pressure in the chamber and causes a change in the capacitance of the capacitor.

The electrical circuit further includes a signal generator for sending an electrical signal through the capacitor and a signal processor for detecting a change in the electrical signal caused by an increase in the capacitance of the capacitor.

BRIEF DESCRIPTION OF THE DRAWINGS

The foregoing and other features of the invention will become more apparent to one skilled in the art upon consideration of the following description of the invention and the accompanying drawings in which:

FIG. 3A is a view showing a portion of the initiator of FIG. 2 in a first condition;

FIG. 3B is a view similar to FIG. 3A showing the initiator in a second condition;

FIG. 4 is a schematic diagram of an electrical circuit for use in the present invention; and FIG. 5 is a graph plotting voltage versus time in the electrical circuit of FIG. 4.

DESCRIPTION OF A PREFERRED EMBODIMENT

Figure 1:
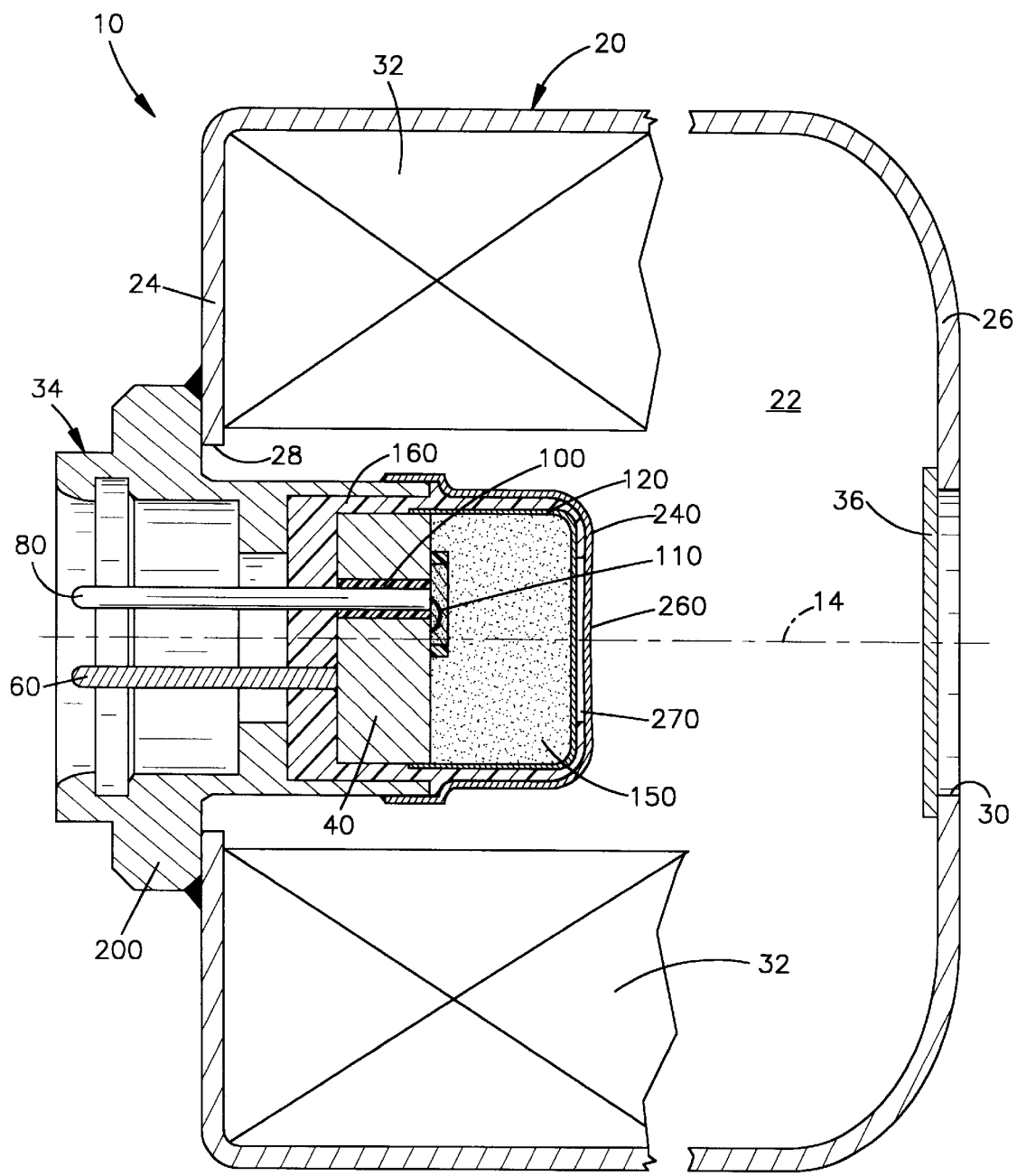
FIG. 1 is a partial schematic sectional view of an inflator for inflating an inflatable vehicle occupant protection device, the inflator having a pressure monitoring initiator constructed in accordance with the present invention.

The present invention relates to an inflator for inflating an inflatable vehicle occupant protection device, and particularly relates to an inflator having a pressure monitoring initiator. The present invention is applicable to inflatable vehicle occupant protection devices of various constructions such as inflatable air bags, inflatable seat belts, inflatable knee bolsters and knee bolsters operated by inflatable air bags, inflatable head liners, and inflatable side curtains. Further, the present invention can be applied to inflators which include one or more stored gases, or to inflators which include one or more stored gases and a combustible gas generating material for heating the stored gas. As representative of the present invention, FIG. 1 schematically illustrates an inflator 10 for inflating an inflatable air bag (not shown).

The inflator 10 is centered on an axis 14 and includes a container 20. The container 20 defines a chamber 22 within the inflator 10. The container 20 includes axially opposed first and second end walls 24 and 26, respectively. The first end wall 24 has a first opening 28 into the container 20. The second end wall 26 has a second opening 30 into the container 20. The first and second openings 28 and 30 are centered on the axis 14. An annular body of pyrotechnic material, indicated schematically at 32, is disposed within the chamber 22. A quantity of an inflation fluid, preferably a gas such as argon or nitrogen, is stored under pressure in the chamber 22.

An electrically actuatable initiator 34 projects through the first opening 28 into the chamber 22 in the container 20 and is exposed to the gas stored under pressure in the chamber 22. The initiator 34 is centered on the axis 14. A diaphragm or burst disk 36 closes the second opening 30 in the container 20 to maintain the pressure of the gas stored in the container. The second opening 30, when open, directs gas from inside the chamber 22 in the container 20 into the air bag to inflate the air bag to help protect a vehicle occupant.

The initiator 34 includes a generally cylindrical header 40 centered on the axis 14. The header 40 is made of metal and has a cylindrical outer surface 42 (FIG. 2) which extends axially between radially extending first and second end surfaces 44 and 46, respectively. A cylindrical inner surface 48 defines a cylindrical opening 50 extending axially through the header 40 between the end surfaces 44 and 46. The opening 50 is radially offset from the axis 14.

An electrically conductive first terminal 60 is attached to the header 40. The first terminal 60 is a metal pin which extending parallel to and radially offset from the axis 14. An inner end portion 62 of the first terminal 60 is welded to the second end surface 46 of the header 40. An outer end portion 64 of the first terminal 60 extends away from the header 40 in a direction parallel to the axis 14.

An electrically conductive second terminal 80 extends parallel to the first terminal 60. The second terminal 80 is a metal pin and is radially offset from the axis 14. An inner end portion 82 of the second terminal 80 extends axially through the opening 50 in the header 40. An inner end surface 84 of the second terminal 80 is co-planar with the first end surface 44 of the header 40. An outer end portion 86 of the second terminal 80 extends away from the header 40 in a direction parallel to the axis 14.

An insulator 100 made of an electrically insulative (or non-conductive) material encircles the inner end portion 82 of the second terminal 80. The insulator 100 fills an annular space between the inner end portion 82 of the second terminal 80 and the inner surface 48 defining the opening 50 in the header 40. The insulator 100 electrically insulates the second terminal 80 from the header 40.

A bridgewire 110 extends between the inner end surface 84 of the second terminal 80 and the first end surface 44 of the header 40 to connect electrically the second terminal and the header. The bridgewire 110 is a thin metal resistance wire that heats up and generates thermal energy when an electrical current of a predetermined magnitude passes through the bridgewire.

The bridgewire 110 extends through and is embedded in a portion of an ignition charge 112. The ignition charge 112 is a pyrotechnic material, such as zirconium potassium perchlorate, which auto-ignites in response to thermal energy of a predetermined magnitude. The ignition charge 112 is enclosed in a charge holder 114 which is mounted on the first end surface 44 of the header 40.

A first housing 120 is welded to the header 40. The first housing 120 is a cup-shaped electrically conductive member made of metal. The first housing 120 is preferably made of drawn stainless steel, but could alternatively be made of aluminum.

The first housing 120 is centered on the axis 14. The cup-shape of the first housing 120 is defined by an axially extending cylindrical side wall 122 and a radially extending end wall 124. The side wall 122 overlies a portion of the outer surface 42 of the header 40 and is attached to the header by an annular weld 126. The side wall 122 has parallel, cylindrical inner and outer surfaces 128 and 130, respectively. The end wall 124 has parallel inner and outer surfaces 132 and 134, respectively. The inner surface 128 of the side wall 122 and the inner surface 132 of the end wall 124 together define a charge chamber 136 in the first housing 120.

An output charge 150 is contained within the charge chamber 136. The output charge 150 is a pyrotechnic material such as a powder mixture of 50% $BKNO_3$ and 50% titanium subhydride potassium perchlorate. The output charge 150, upon being ignited by the ignition charge 112, generates hot gases to ignite the pyrotechnic material 32 in the chamber 22 in the inflator 10.

A body of injection molded plastic material 160 is centered on the axis 14 and includes a lower (as viewed in FIG. 2) half portion 162 and an upper (as viewed in FIG. 2) half portion 164. The lower half portion 162 of the plastic material 160 surrounds the header 40. The lower half portion 162 extends over the second end surface 46 of the header 40 and the cylindrical outer surface 42 of the header. The lower half portion 162 of the plastic material 160 includes an axially extending outer surface 166 and a radially extending lower end surface 168. The lower half portion 162 further includes first and second axially extending, cylindrical passages 170 and 172, respectively. The first and second terminals 60 and 80 extend through the first and second passages 170 and 172, respectively.

The upper half portion 164 of the plastic material 160 surrounds a portion of the first housing 120. More specifically, the plastic material 160 extends over the outer surface 130 of the side wall 122 of the first housing 120 and over a portion of the end wall 124 of the first housing member. The upper half portion 164 of the plastic body 160 includes an axially extending outer surface 174 and a radially extending upper end surface 176. An axially extending cylindrical surface 178 in the upper half portion 164 of the plastic material 160 adjacent the end wall 124 of the first housing 120 defines a circular opening 180 in the plastic material. The opening 180 is centered on the axis 14.

The plastic material 160 further includes an annular ridge 182 extending radially outward. The annular ridge 182 is located approximately midway between the upper and lower half portions 162 and 164 of the plastic material 160 and extends outward from the intersection of the outer surface 166 in the lower half portion and the outer surface 174 in the upper half portion.

The initiator 34 includes an adapter 200 that encloses the lower half portion 162 of the plastic material 160. The adapter 200 is centered on the axis 14 and is made of a weldable metal, such as stainless steel. The adapter 200 includes radially extending first and second surfaces 202 and 204, respectively, connected by an axially extending third surface 206. The first surface 202 adjoins the lower end surface 168 of the plastic material 160 and the third surface 206 adjoins the outer surface 166 in the lower half portion 162 of the plastic material. The second surface 204 of the adapter 200 abuts the annular ridge 182 of the plastic material 160.

The adapter 200 further includes an internal cavity 210 surrounding the first and second terminals 60 and 80. The internal cavity 210 receives an electrical connector (not shown) for making an electrical connection with the first and second terminals 60 and 80. An annular flange 212 on the adapter 200 abuts the first end wall 24 of the container 20 and is welded to the first end wall (FIG. 1).

Figure 2:
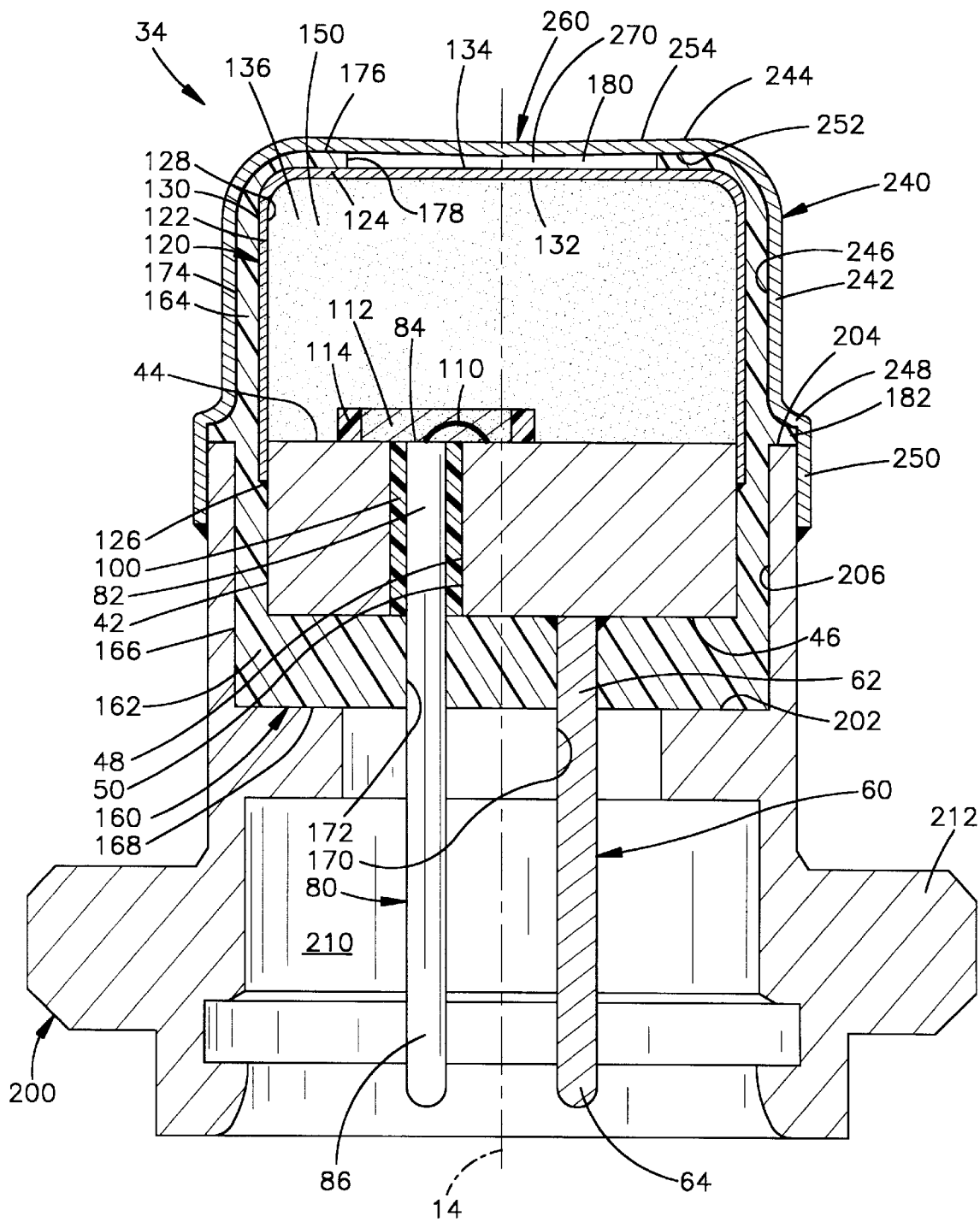
FIG. 2 is an enlarged sectional view of the initiator of FIG. 1.

A second housing 240 is connected with the adapter 200 (FIG. 2). The second housing 240 overlies the upper half portion 164 of the plastic material 160 and thereby encircles and encloses the first housing member 120. The second housing 240 is electrically insulated from the first housing 120 by the plastic material 160. The second housing 240 is a generally cup-shaped electrically conductive member made of metal. The second housing 240 is preferably made of drawn stainless steel, but could alternatively be made of aluminum.

The second housing 240 is centered on the axis 14. The cup shape of the second housing 240 is defined by a generally axially extending side wall 242 and a generally radially extending end wall 244. The side wall 242 has an inner surface 246 adjoining the outer surface 174 of the plastic material 160. The side wall 242 also includes a radially outwardly directed flange portion 248 and an extension portion 250. The flange portion 248 of the side wall 242 abuts the annular ridge 182 of the plastic material 160. The extension portion 250 of the side wall 242 overlaps a portion of the adapter 200 and is welded to the adapter to attach the second housing 240 to the adapter.

The end wall 244 of the second housing 240 has parallel inner and outer surfaces 252 and 254, respectively. The inner surface 252 of the end wall 244 adjoins the upper end surface 176 in the upper half portion 164 of the plastic material 160 and covers the opening 180 in the upper half portion. The end wall 244 of the second housing 240 includes a deflectable portion 260 centered on the axis 14 and axially overlying the opening 180 in the plastic material 160. The inner and outer surfaces 252 and 254 of the end wall 244 extend across the deflectable portion 260 of the end wall.

The inner surface 252 of the end wall 244 of the second housing 240, the outer surface 134 of the end wall 124 of the first housing 120, and the axially extending surface 178 in the upper half portion 164 of the plastic material 160 together define a gap 270 in the initiator 34. The gap 270 is preferably filled with air, but could alternatively be filled with another suitable type of dielectric material.

The deflectable portion 260 of the end wall 244 is deflectable between a first condition shown in FIGS. 1–3A and a second condition shown in FIG. 3B. In the first condition, the deflectable portion 260 of the end wall 244 is not planar, but is instead bowed slightly axially inward toward the end wall 124 of the first housing 120 as best seen in FIG. 3A. In the second condition, the deflectable portion 260 of the end wall 244 is not planar either, but is instead bowed slightly axially outward away from the end wall 124 of the first housing 120 as shown in FIG. 4.

The deflectable portion 260 of the end wall 244 deflects in response to the amount of fluid pressure on the outer surface 254 of the end wall 244 of the second housing 240. When the pressure of the gas in the chamber 22 in the container 20 is at a predetermined pressure level, the deflectable portion 260 of the end wall 244 is in the first condition (FIGS. 1–3A). The predetermined pressure level is typically in the range of about 2500 psi to 5000 psi and is selected to be sufficient to cause the air bag to inflate in the desired manner when the inflator 10 is actuated. When the pressure of the gas in the chamber 22 is at the predetermined level, the gap 270 has a predetermined axial dimension or length L1 (FIG. 3A). The axial dimension L1 is measured along the axis 14 from the outer surface 134 of the end wall 124 of the first housing 120 to the inner surface 252 of the deflectable portion 260 of the end wall 244 of the second housing 240.

If the pressure of the gas in the chamber 22 falls below the predetermined pressure level, such as may occur if a leak develops in the container 20, the deflectable portion 260 of the end wall 244 deflects from the first condition toward the second condition (FIG. 3B). As the deflectable portion 260 deflects, the axial dimension of the gap 270 increases beyond the predetermined axial dimension L1 toward an axial dimension or length L2. Thus, as the pressure in the chamber 22 decreases below the predetermined pressure level, the axial dimension of the gap 270 increases beyond the predetermined axial dimension L1. Therefore, a reduction in the pressure level in the chamber 22 below the predetermined pressure level can be monitored by sensing an increase in the axial dimension of the gap 270 beyond the predetermined axial dimension L1.

Such an increase in the axial dimension of the gap 270 beyond the predetermined axial dimension L1 is sensed by an electrical circuit 280 (FIG. 4). The electrical circuit 280 includes a square wave signal generator 282 operatively coupled to the vehicle electrical system (not shown). The electrical circuit 280 further includes a first resistor 284, a capacitor 286 in series with the first resistor, a second resistor 288 in parallel with the first resistor and the capacitor, and a signal processor 290. The signal processor 290 senses a change in the capacitance of the capacitor 286 by comparing the voltage measured across the capacitor 286 (between points A and B in the electrical circuit 280) to the generated voltage signal.

In the initiator 34, the first and second housings 120 and 240 and the gap 270 formed between the housings 120, 240 function as the capacitor 286 in the electrical circuit 280. The capacitance of the capacitor 286 changes when the axial dimension of the gap 270 changes. If the axial dimension of the gap 270 increases due to a decrease in the pressure in the container 20, the capacitance of the capacitor 286 correspondingly increases.

Voltage signals are periodically generated by the generator 282 and are sent via the first terminal 60 and the header 40 to the capacitor 286 formed by the first housing 120, the gap 270, and the second housing 240. The second resistor 288 serves as a means for fully discharging the capacitor 286 after each voltage signal is passed through the capacitor. The signal processor 290 is electrically connected to the second housing 240 and to a vehicle ground (not shown) to complete the electrical circuit 280.

The signal processor 290 compares the voltage across the capacitor 286 (between points A and B in FIG. 4) by measuring a time T that it takes for the voltage signal, indicated by the heavy dotted line in FIG. 5, to reach a known reference voltage $V_r$. The time T also corresponds to the time it takes for the voltage signal to charge the capacitor 286. The time T has a predetermined value when the pressure in the chamber 22 in the container 20 is at the predetermined level and the gap 270 is at its predetermined axial dimension L1.

When the pressure in the chamber 22 falls below the predetermined level and the axial dimension of the gap 270 correspondingly increases as a result of the deflectable portion 260 of the end wall 244 deflecting, the time T exceeds its predetermined value. The signal processor 290 monitoring the voltage signal detects that the predetermined time value has been exceeded and sends a signal to an output device (not shown), such as a warning light on the vehicle instrument panel, that the pressure in the inflator 10 is below the predetermined level. As another indication that the pressure in the inflator 10 has fallen below the predetermined level, the signal processor 290 can also look for a change in the slope of the voltage signal across the capacitor 286 as the capacitor discharges following each square wave cycle. A predetermined threshold slope for the voltage signal across the capacitor 286 is shown in FIG. 5 as the portion of the heavy dotted line extending between the end of the initial square wave cycle and the beginning of the next square wave cycle. Any departure in the slope of this portion of the voltage signal from its predetermined threshold slope would be detected by the signal processor 290.

In addition to the aforementioned pressure monitoring function, the inflator 34 is operable to initiate the release of the inflation fluid from the chamber 22 in the inflator 10. Upon the occurrence of a collision involving the vehicle in which the inflator 10 is mounted, a collision sensor (not shown) provides an electrical signal to a controller (not shown). The controller causes an electrical current to flow through the first and second terminals 60 and 80 and through the bridgewire 110 connecting the terminals. The bridgewire 110 heats up and ignites the ignition charge 112 which, in turn, ignites the output charge 150 in the charge chamber 136. Ignition of the output charge 150 causes the first and second housings 120 and 240 to rupture. Combustion products from combustion of the output charge 150 ignite the pyrotechnic material 32 in the chamber 22 in the container 20.

Ignition of the pyrotechnic material 32 generates heat which increases the pressure of the inflation fluid in the chamber 22. When the pressure reaches a predetermined level, the burst disk 36 ruptures to open the second opening 30 in the container 20 and releases the stored inflation fluid. The inflation fluid stored in the chamber 22 in the container 20 and heated by the pyrotechnic material 32 is directed through the second opening 30 to inflate the air bag.

From the above description of the invention, those skilled in the art will perceive improvements, changes and modifications. For example, the body of plastic material 160 could be alternatively be made of another suitable electrically insulative material, such as a ceramic material. Further, the electrical circuit 280 could be replaced with a different detection circuit, such as a Wheatstone Bridge wherein a signal processor looks for attenuation or phase shift of a high frequency signal sent to the capacitor formed by the first and second housings 120 and 240 and the gap 270. Such improvements, changes and modifications within the skill of the art are intended to be covered by the appended claims.

Having described the invention, we claim:

1. An apparatus for inflating an inflatable vehicle occupant protection device, said apparatus comprising:

means for defining a chamber;

inflation fluid at a predetermined pressure in said chamber;

an initiator for initiating the release of said inflation fluid from said chamber, said initiator including a capacitor, the capacitance of which changes with a change in pressure in said chamber; and means for sensing a change in the capacitance of said capacitor.

2. The apparatus of claim 1 wherein the capacitance of said capacitor increases when the pressure in said chamber decreases.

3. The apparatus of claim 1 wherein said initiator includes an electrically conductive outer housing member, an electrically conductive inner housing member, and means for providing a gap and extending between said inner and outer housing members, said capacitor comprising said inner and outer housing members and said gap.

4. The apparatus of claim 3 wherein said means for sensing a change in pressure in said chamber comprises an electrical circuit including said capacitor.

5. The apparatus of claim 4 wherein said means for providing said gap comprises an electrically insulative material disposed between said inner and outer housing members and partially defining said gap.

6. The apparatus of claim 5 wherein said gap is an air gap.

7. The apparatus of claim 5 wherein said outer housing member has a deflectable portion that deflects in response to pressure changes in said chamber, said gap having a predetermined dimension measured along said axis and extending between said inner housing member and said deflectable portion of said outer housing member when said inflation fluid is at said predetermined pressure level, said predetermined dimension of said gap changing in response to a change in pressure in said chamber and causing a change in the capacitance of said capacitor.

8. The apparatus of claim 7 wherein said electrical circuit further includes a signal generator and a signal processor, said signal generator sending an electrical signal through said capacitor, said signal processor detecting a change in the electrical signal caused by an increase in the capacitance of said capacitor.

9. An apparatus for use in an inflator for inflating an inflatable vehicle occupant protection device, the inflator including a container having a chamber containing inflation fluid at a predetermined pressure level, said apparatus comprising:

an electrically conductive first member, said first member defining a charge chamber containing a pyrotechnic charge;

an electrically conductive second member spaced from said first member, said second member having a deflectable portion that deflects in response to pressure changes in the chamber in the inflator;

an electrically insulative material disposed between said first member and said second member, said electrically insulative material defining a gap extending between said first member and said deflectable portion of said second member, said gap having a predetermined axial dimension measured along said axis from said first member to said deflectable portion of said second member when the inflation fluid in the chamber in the inflator is at the predetermined pressure level, said predetermined axial dimension of said gap changing in response to a change in pressure in the chamber; and means for sensing a decrease in pressure in the chamber below the predetermined pressure level by sensing a change in said axial dimension of said gap.

10. The apparatus of claim 9 wherein said means for sensing a change in pressure in the chamber comprises an electrical circuit including said first member, said second member, and said gap.

11. The apparatus of claim 10 wherein said first member, said second member, and said gap function as a capacitor, the capacitance of which increases when the pressure in the chamber decreases.

12. The apparatus of claim 11 wherein said electrical circuit further includes a signal generator and a signal processor, said signal generator generating an electrical signal to send through said capacitor, said signal processor detecting a change in the electrical signal caused by an increase in the capacitance of said capacitor.

13. The apparatus of claim 10 wherein said gap is filled with air.

14. The apparatus of claim 10 wherein said apparatus comprises an initiator for initiating the release of the inflation fluid from the chamber in the inflator upon ignition of said pyrotechnic charge.

15. The apparatus of claim 10 wherein said electrically insulative material has an axially extending surface partially defining said gap.

16. The apparatus of claim 10 wherein said first member comprises an inner housing made of a metallic material and said second member comprises an outer housing made of a metallic material, said outer housing encircling and enclosing said inner housing.

17. The apparatus of claim 16 further comprising an electrically conductive header, said inner housing being fixedly attached to said header to close and seal said charge chamber containing said pyrotechnic charge.

18. The apparatus of claim 17 further comprising a first electrical terminal and a second electrical terminal, said first electrical terminal being fixedly attached to said header and being electrically coupled to a source of electrical energy, said second electrical terminal extending through said header and being electrically isolated from said header.

19. The apparatus of claim 18 further comprising an ignition charge and a bridgewire located in said charge chamber, said bridgewire being embedded in said ignition charge and electrically connecting said second electrical terminal with said header.

* * * * *